(12) United States Patent
Coffield

(10) Patent No.: US 6,966,606 B2
(45) Date of Patent: Nov. 22, 2005

(54) CARRIER AND ATTACHMENT METHOD FOR LOAD BEARING FABRIC

(75) Inventor: Timothy P. Coffield, Grand Rapids, MI (US)

(73) Assignee: Dahti, Inc., Grand Rapids, MI (US)

( * ) Notice: Subject to any disclaimer, the term of this patent is extended or adjusted under 35 U.S.C. 154(b) by 0 days.

(21) Appl. No.: 10/342,602

(22) Filed: Jan. 15, 2003

(65) Prior Publication Data

US 2003/0137179 A1    Jul. 24, 2003

Related U.S. Application Data

(62) Division of application No. 09/666,624, filed on Sep. 20, 2000, now Pat. No. 6,540,950.

(51) Int. Cl.[7] .............................................. A47C 7/02
(52) U.S. Cl. ............................. 297/452.56; 297/452.38
(58) Field of Search ....................... 297/452.15, 452.13, 297/204, 201, 284.11, 440.11, 452.18, 452.63, 297/452.38, 218.3, 218.5, 452.64, 452.56, 297/DIG. 2

(56) References Cited

U.S. PATENT DOCUMENTS

| | | | |
|---|---|---|---|
| 265,302 | A | 10/1882 | Brigham |
| 614,235 | A | 11/1898 | Palmer |
| 662,647 | A | 11/1900 | Howe |
| 1,120,686 | A | 12/1914 | Burrowes |
| 1,698,065 | A | 1/1929 | Otto |
| 1,711,670 | A | 5/1929 | Brennan |
| 2,156,664 | A | 5/1939 | Little |
| 2,374,801 | A | 5/1945 | Bolick, Sr. |
| 2,856,990 | A | 10/1958 | Thomas |
| 3,041,109 | A | 6/1962 | Eames et al. |
| 3,061,374 | A | 10/1962 | Grosfillex |
| 3,165,359 | A | 1/1965 | Ashkouti |
| 3,175,269 | A | 3/1965 | Raduns et al. |
| 3,179,469 | A | 4/1965 | Heuston |
| 3,208,085 | A | 9/1965 | Grimshaw |
| 3,214,314 | A | 10/1965 | Rowbottam |
| 3,298,743 | A | 1/1967 | Albinson et al. |
| 3,375,861 | A | 4/1968 | Marlow |
| 3,438,099 | A | 4/1969 | Green |

(Continued)

FOREIGN PATENT DOCUMENTS

CA                653100              11/1962

(Continued)

OTHER PUBLICATIONS

Ultraflex Corporation, "Ultraflex Elastic Webbing for Residential and Commercial Seating", product brochure, 1998.

(Continued)

Primary Examiner—Milton Nelson, Jr.
(74) Attorney, Agent, or Firm—Warner Norcross & Judd LLP

(57) ABSTRACT

An attachment structure for a load bearing fabric. The attachment structure includes an expandable carrier secured to an unstretched load bearing fabric. To attach the carrier to the frame, the carrier and fabric are stretched together to desired shape and secured to a support frame. A method for securing a load bearing fabric to a support structure is also provided. The method generally includes the steps of (a) providing a relaxed section of load bearing fabric, (b) molding an expandable carrier about the fabric while the fabric is in the relaxed state, the configuration of the frame being preselected to assume the desired shape upon later expansion (c) expanding the carrier and fabric to provide the fabric with the desired tension and (d) securing the expanded carrier and tensioned fabric to the support structure.

7 Claims, 8 Drawing Sheets

U.S. PATENT DOCUMENTS

| | | |
|---|---|---|
| 3,498,668 A | 3/1970 | Vanderminden |
| 3,601,446 A | 8/1971 | Horby |
| 3,640,576 A | 2/1972 | Morrison et al. |
| 3,844,612 A | 10/1974 | Borggren et al. |
| 3,999,802 A | 12/1976 | Powers |
| 4,062,590 A | 12/1977 | Polsky et al. |
| 4,299,645 A * | 11/1981 | Newsom ............ 156/258 |
| 4,304,436 A | 12/1981 | Rowland |
| 4,456,301 A | 6/1984 | Apissomian |
| 4,458,943 A | 7/1984 | Krakauer |
| 4,472,862 A | 9/1984 | Bloomfield et al. |
| 4,492,408 A | 1/1985 | Lohr |
| 4,522,444 A | 6/1985 | Pollock |
| 4,558,904 A | 12/1985 | Schultz |
| 4,603,907 A | 8/1986 | Witzki |
| 4,670,072 A | 6/1987 | Pastor et al. |
| 4,697,847 A | 10/1987 | Herschlag |
| 4,723,816 A * | 2/1988 | Selbert et al. ......... 297/452.56 |
| 4,796,955 A | 1/1989 | Williams |
| 4,815,499 A | 3/1989 | Johnson |
| 4,826,249 A | 5/1989 | Bradbury |
| 4,842,257 A | 6/1989 | Abu-Isa et al. |
| 4,928,334 A | 5/1990 | Kita |
| 4,939,183 A | 7/1990 | Abu-Isa et al. |
| 4,946,224 A | 8/1990 | Leib |
| 5,009,827 A | 4/1991 | Abu-Isa et al. |
| 5,013,089 A | 5/1991 | Abu-Isa et al. |
| 5,127,707 A | 7/1992 | Forcolini |
| 5,176,860 A | 1/1993 | Storch |
| 5,178,815 A | 1/1993 | Yokote et al. |
| 5,288,136 A | 2/1994 | Webber et al. |
| 5,318,348 A | 6/1994 | Hess |
| 5,503,455 A | 4/1996 | Yang |
| 5,662,383 A | 9/1997 | Hand |
| 6,059,368 A | 5/2000 | Stumpf et al. |
| 6,463,990 B1 * | 10/2002 | Welfonder ............ 160/238 |

FOREIGN PATENT DOCUMENTS

| | | |
|---|---|---|
| GB | 918743 | 2/1963 |
| GB | 1222908 A2 * | 2/1971 |
| RU | 1065262 | 1/1984 |

OTHER PUBLICATIONS

Rockler Companies, Inc., The Woodworkers' Store 1990, "Metal Ends", p. 41004.

Rockler Companies, Inc., The Woodworkers' Store 1993, "Texweb", p. 40998.

One in Vermillion, "Dymetrol Seating Support Systems, Plastic Extrusion attachment information", http://www.oneinvermillion.com/seating_systems.htm.

One in Vermillion, "Metal Frame Installation Techniques", http://www.oneinvermillion.com/metal_frame.htm.

Photograph of Optiride sample attached as Exhibit A.

* cited by examiner

CARRIER AND ATTACHMENT METHOD FOR LOAD BEARING FABRIC

BACKGROUND OF THE INVENTION

This is a division of application Ser. No. 09/666,624, filed Sep. 20, 2000 (now U.S. Pat. No. 6,540,950).

The present invention relates to load bearing fabric, and more particularly to components and methods for securing a load bearing fabric to a support structure.

The use of load bearing fabrics continues to grow dramatically in various industries, including the automotive, office and home seating industries. The term "load bearing fabric" is commonly used to refer to a class of high strength, highly durable textiles that are typically woven from elastomeric monofilaments and conventional yarns. Some of today's load bearing fabrics have greater strength and durability characteristics than spring steel and other conventional load bearing materials. In addition to their strength and durability characteristics, load bearing fabrics are lightweight and typically have a high modulus of elasticity. Therefore, they are well-suited for use in a variety of applications where a strong and durable yet lightweight or elastic load bearing surface is desired, for example, in seating, cots and wheelchair applications. Further, because load bearing fabrics are aesthetically pleasing they can and often are exposed during use, for example, as the seat or back of an office chair. This eliminates the need to cover or trim conventional load bearing surfaces.

One particularly important challenge related to the use of load bearing fabric is the challenge of attaching the fabric to the support structure. Although load bearing fabrics have high strength and durability characteristics, they must be properly attached to the support structure to provide an end product with the desired strength and durability. Conventional attachment methods often fail to provide the necessary strength and durability to withstand the forces applied to the fabric. As a result, the fabric separates from the support structure under conditions that the fabric is otherwise well-suited to survive. In some applications, the bond itself may fail and in other applications, the method of attachment may cause the fabric to unravel or separate along the periphery of the fabric. Accordingly, there is an ongoing effort to develop new and improved methods and components for securing the load bearing fabric to the support structure.

Perhaps the most common use of load bearing fabric is in the furniture industry, where load bearing fabrics are used to form the seat and back of task seating, executive chairs and other office chairs. In the furniture industry, load bearing fabrics are typically secured to a support structure by a carrier, often in the form of a peripheral frame. The fabric is first attached to the carrier and then the carrier is attached to the support structure, such as the seat frame or back frame. In such applications, the challenge is to secure the carrier in a way that provides a strong and durable bond without damaging or promoting unraveling of the fabric. One conventional method for addressing these issues is to secure the load bearing fabric to a carrier through encapsulation. In general, encapsulation involves the molding of a carrier in situ about the peripheral edge of the fabric. During the molding process, the material of the carrier flows through and becomes intimately intersecured with the fabric. The carrier is then secured to the support structure using fasteners or other conventional techniques and apparatus.

Although encapsulation provides a strong and durable bond, it suffers from a number of disadvantages. To provide the chair with a firm seat and back, the fabric must typically be tightly stretched over the chair and back frames. The conventional method for providing the fabric with the desired amount of stretch is to hold the fabric in a stretched position while the carrier is molded in place about the fabric. This operation involves the use of expensive looms and stretching machinery. The stretching machinery stretches the fabric to the desired position. The stretched fabric is then mounted to the loom, which holds the fabric in the stretched position during the molding process. It may also be necessary to provide molding equipment that is specially configured to operate while the stretched fabric is held by the loom. Further, when the molded carrier and fabric emerge from the mold, the force of the stretched fabric can cause the carrier to deform, for example, to bow or "potato chip." This creates the need to return the carrier to the desired shape, typically using additional machinery, prior to attachment to the support structure. As can be seen, encapsulation requires a relatively complex manufacturing process that employs expensive looms and stretching machinery.

SUMMARY OF THE INVENTION

The aforementioned problems are overcome by the present invention wherein a carrier for a load bearing fabric is provided which is expandable to permit the fabric to be stretched after its attachment to the carrier. After the carrier is attached to the fabric, the carrier and fabric are expanded and mounted to the support structure in the expanded condition. The carrier is preferably manufactured from a pliable and resilient polymeric material that is molded in place on the fabric and is capable of being stretched along with the fabric after molding.

In a preferred embodiment, the cross-section of the carrier is controlled to dictate the amount of stretch in various regions of the fabric. For example, the carrier may include a constant cross-section to provide substantially uniform and consistent stretch around the carrier. Alternatively, the cross-section can be increased in regions where less stretch is desired.

In a second preferred embodiment, the carrier includes expansion joints that control the amount and direction of stretch. The expansion joints preferably include a plurality of ribs that extend along the carrier in an "X"-shaped pattern or a single rib in a zig-zag pattern. During initial stretching, the ribs provide relatively little resistance as they pivot or deflect into general alignment with the longitudinal extent of the carrier. Once the ribs are generally aligned with the longitudinal extent of the carrier, they cease pivoting and instead must be elongated or stretched to permit further stretching of the carrier. Elongation of the ribs requires substantially more force than deflection. As a result, the resistance to deformation in a given region increases significantly once that region has undergone initial stretching. This tends to cause the carrier to undergo initial stretching along its entire length before undergoing any further stretching in a given region.

In a second aspect of the invention, the carrier includes corner joints that deform as the fabric is stretched. The corner joints may include corner loops that deform as the fabric is stretched to permit expansion of the carrier without substantial stretching or the carrier. Alternatively, the corner joints may include thinned corners that focus stretching into the corners of the carrier.

The present invention also provides a method for attaching a load bearing fabric to a support structure. The method generally includes the steps of (a) providing a non-stretched load bearing fabric, the characteristics of the fabric being preselected to accommodate the desired amount of stretch, (b) attaching an expandable carrier to the fabric while the fabric remains unstretched, the characteristics of the carrier being preselected to accommodate the desired amount of stretch, (c) stretching the carrier and fabric in combination, and (d) attaching the stretched carrier and fabric combination to the support structure.

The present invention provides a simple and effective method for attaching a load bearing fabric to a support structure. The encapsulated bond of the preferred embodiment provides a strong and durable interconnection between the carrier and the fabric. Also, because the carrier is not bonded to the fabric while in the stretched condition, manufacture of the carrier and fabric is relatively simple and inexpensive. Further, the expansion joints provide an effective mechanism for providing controlled and consistent stretch along the carrier. Additionally, the corner joints permit the fabric to be stretched without stretch of the carrier or with stretch of the carrier limited to the corner regions. Accordingly, the present invention provides for an inexpensive yet strong and highly durable attachment.

These and other objects, advantages, and features of the invention will be readily understood and appreciated by reference to the detailed description of the preferred embodiment and the drawings.

DETAILED DESCRIPTION OF THE PREFERRED EMBODIMENT

For purposes of disclosure, and not limitation, the present invention is described in connection with an office chair 10 having load bearing fabric that forms the seat and back of the chair. The present invention is well-suited for use in a wide variety of other applications incorporating load bearing fabric, such as other furniture applications, keyboard trays, mouse trays and cots. In the following description, the terms "inner," "outer," "inwardly," "outwardly," "upper" and "lower" are used to refer to directions relative to the geometric center of the fabric. Additionally, the word "expand" means to stretch, deform or otherwise increase the size of the object; the word "stretch" means to expand primarily through longitudinal, elongation; and the word "deform" means to expand primarily through deflection or bending.

Figure 1:
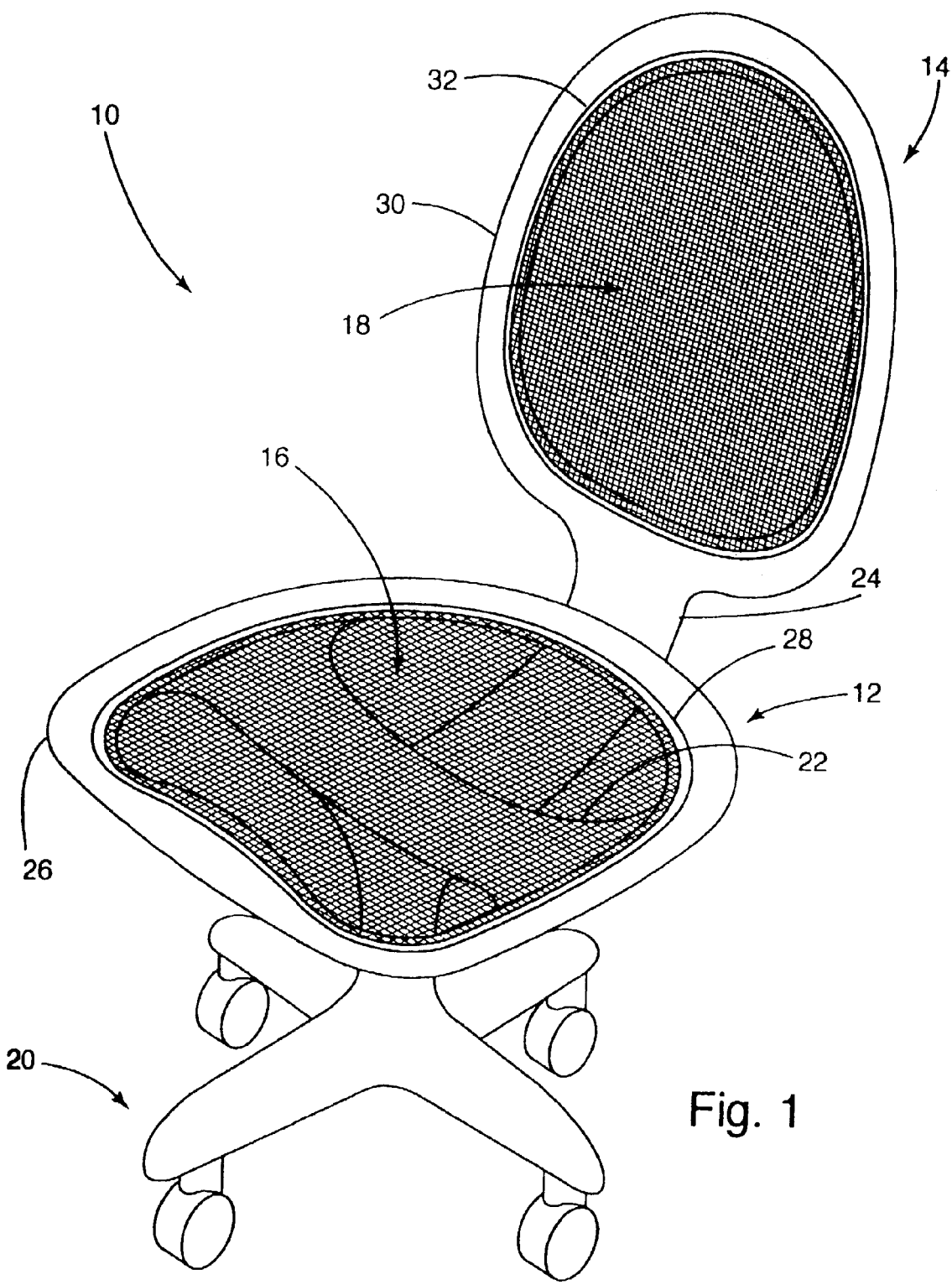
FIG. 1 is a perspective view of an office chair incorporating a preferred embodiment the present invention.

An office chair manufactured in accordance with a preferred embodiment of the present invention is shown in FIG. 1, and generally designated 10. The office chair 10 includes a seat 12 and a back 14, each having a load bearing fabric 16 and 18 that forms the corresponding support surface. The load bearing fabric 16 is secured to the seat 12 in a tensioned state by an expanded seat carrier 28. Similarly, the load bearing fabric 18 is secured to the back 14 in a tensioned state by an expanded back carrier 32. In general, the seat 12 is manufactured by (a) placing an unstretched section of load bearing fabric 16 in a mold (not shown), (b) molding the seat carrier 28 in situ about the periphery of the unstretched fabric 16, (c) expanding the seat carrier 28 to apply the desired tension to the load bearing fabric 16, and (d) securing the expanded seat carrier 28 to the seat 12 in its expanded state to mount the fabric 16 to the seat 12 with the desired tension.

The office chair 10 is generally conventional, except for the loading bearing fabric attachment of the present invention. Accordingly, the chair 10 will not be described in detail. In general, however, the chair 10 includes a conventional pedestal 20, top plate 22 and back support 24 that support the seat 12 and the back 14 in a conventional manner. The seat 12 generally includes a seat frame 26, a seat carrier 28 and a section of load bearing fabric 16. The seat frame 26 is mounted to the top plate 22. The seat carrier 28 carries the load bearing fabric 16 and is mounted to the seat frame 26 in an expanded state. The back 14 of the chair 10 is constructed in accordance with substantially the same principles as the seat 12. Although the size and shape of the back 14 differ from those of the seat 12, the general components and method of manufacture of the back 14 are substantially identical to those of the seat 12. Accordingly, the construction and method of manufacture of the back 14 will not be described in detail. Suffice it to say that the back 14 includes a back frame 30, a back carrier 32 and a section of load bearing fabric 18. The back frame 30 is mounted to the back support 24. The back carrier 32 is molded in situ about the fabric 18 while the fabric 18 is in a relaxed state. The back carrier 32 is mounted to the back frame 30 in an expanded state to support the fabric 18 in a tensioned or stretched state.

Figure 2:
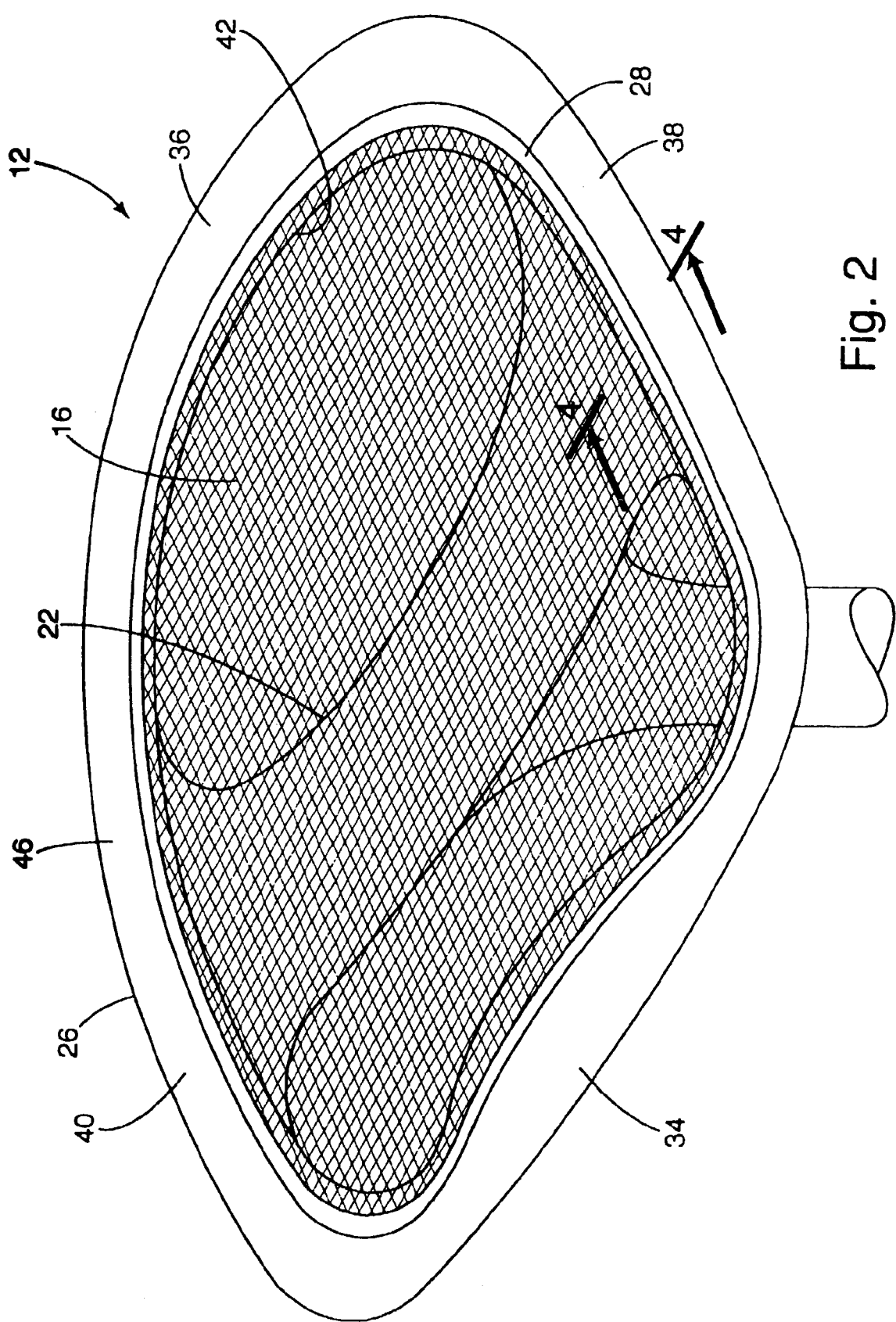
FIG. 2 is a perspective view of the seat.
Figure 3:
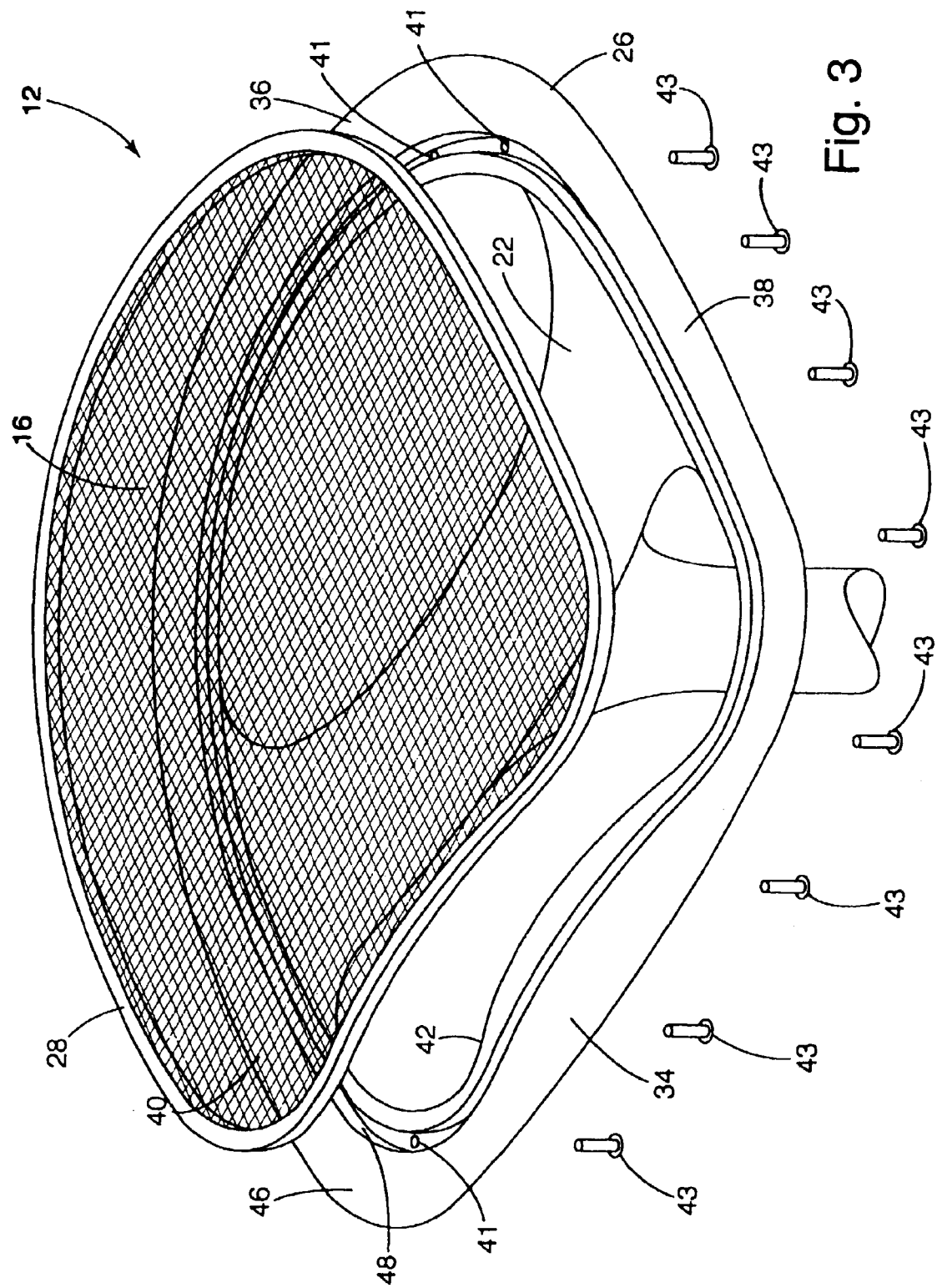
FIG. 3 is an exploded view of the seat frame, seat carrier and load bearing fabric showing the carrier and fabric in the expanded state.

The attachment structure and manufacturing method of the present invention will be described in detail with reference to the seat 12 portion of the office chair 10. As noted above, the seat 12 includes a seat frame 26 and a seat carrier 28 (See FIGS. 2 and 3). The seat frame 26 is preferably a one-piece component generally including front 34, rear 36, left 38 and right 40 members that are configured to define a somewhat square, peripheral framework about a central opening 42. The precise shape of the seat frame 26 will vary from application to application. The lower surface (not shown) of the seat frame 26 is adapted to receive fasteners that mount the seat frame 26 to the top plate 22. For example, the lower surface preferably includes screw bosses 41 adapted to receive screws 43 for securing the seat frame 26 to the top plate 22. Obviously, the seat frame 26 can be secured to the top plate 22 in a variety of alternative ways. The upper surface 46 of the seat frame 26 defines a channel 48 adapted to receive the seat carrier 28. The channel 48 preferably extends around the entire seat frame 26, and is of sufficient dimension to receive substantially all of the seat carrier 28. In some applications, the walls or floor of the channel 48 may include tabs, snaps, ridges or other elements (not shown) that help to maintain the carrier 28 in the channel 48. Alternatively or in addition, the bottom wall of the channel 48 may define slots, screw clearance holes, screw bosses or other conventional elements that facilitate secure attachment of the seat carrier 28 within the channel 48. In the preferred embodiment, the seat frame 26 forms the structural component of the seat 12, bearing the occupants weight and being directly supported by the top plate 22. If desired, the seat frame can alternatively be attached to a structural component, such as a seat pan (not shown), that is in turn attached to the top plate or pedestal.

Figure 4:
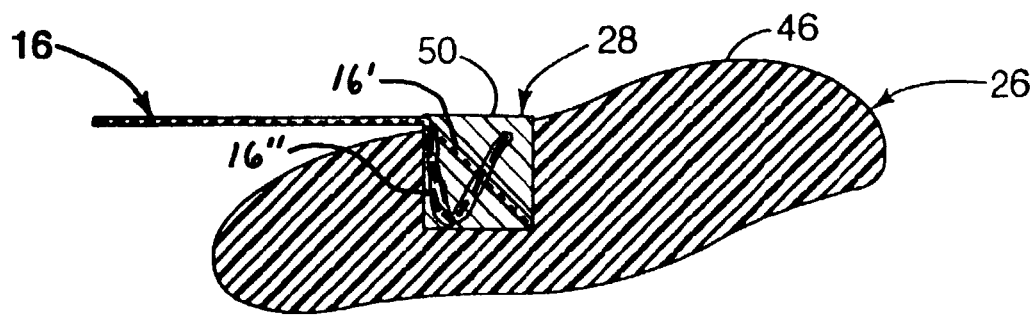
FIG. 4 is a sectional view of the seat carrier and load bearing fabric attached to the seat frame.
Figure 5:
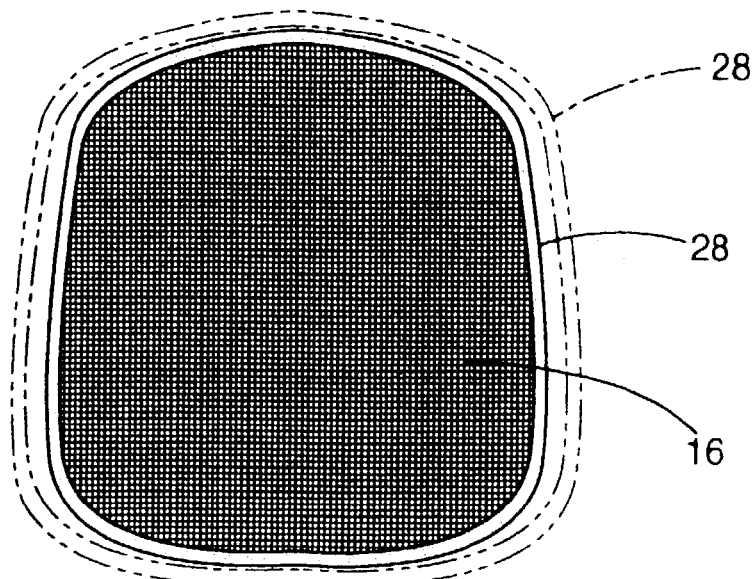
FIG. 5 is a top plan view of the carrier and the fabric, showing the carrier and the fabric in the expanded state in phantom lines.

The seat carrier 28 is preferably molded directly onto the load bearing fabric 16. As a result, after molding, the seat carrier 28 and the fabric 16 become an integrated, one-piece assembly. The seat carrier 28 is molded onto the load bearing fabric 16 while the fabric 16 is in a relaxed state, and the seat carrier 28 and fabric 16 are expanded prior to attachment to the seat frame 26. The size and shape of the seat carrier 28 is preselected so that once stretched, deformed or otherwise expanded to place the fabric under the desired tension, the carrier 28 has attained the shape of the seat frame channel 48. For example, if four percent stretch is desired in the fabric 16, the seat carrier 28 can be molded four percent smaller than the channel 48 in the desired direction of stretch. As another example, if four percent stretch is desired in the front/back direction and two percent is desired in the left/right direction, the seat carrier can be molded four percent smaller in the front/back direction and two percent smaller in the left/right direction. In this preferred embodiment, the seat carrier 28 is expanded through a stretching process. The seat carrier 28 is shown in FIG. 5 in its relaxed state in solid line and in its expanded state in phantom lines. As perhaps best shown in FIG. 4, the seat carrier 28 is generally square in cross section. The load bearing fabric 16 preferably enters the carrier 28 near the upper surface 50 and extends diagonally down through the center of the carrier 28 to maximize the surface area of the fabric contained within the carrier 28. Preferably, the cross-sectional area is consistent about the entire carrier 28. This facilitates consistent and even stretching about the carrier. Alternatively, the cross-sectional area of the carrier 28 can be selectively varied to aid in controlling the location of stretch. For example, the cross-sectional area of the carrier 28 in the corner regions may be reduced with respect to the remainder of the carrier 28 to focus stretching in the corners of the carrier 28. This alternative is described in more detail below.

The load bearing fabric 16 conforms to the desired shape of the seat 12. More specifically, the size and shape of the load bearing fabric 16 is preselected so that once stretched to the desired tension, it has attained the desired shape of the seat 12. As described in more detail below, the load bearing fabric may be any of wide variety of load bearing fabrics, including polyester elastomer fabrics. For purposes of this application, the term "fabric" refers to both woven and non-woven materials, including without limitations knit materials. If desired, woven fabrics with welded warp and weft intersections can be used. These fabrics are particularly well-suited for use in applications in which the material of the carrier is not from the same family of resin as the materials as the fabric. In such applications, the welded intersections permit the carrier 28 to more securely interlocks with the fabric 16. In general, the seat carrier 28 is molded in place about the fabric 16 so that the material of the seat carrier 28 flows through and entraps the warps and wefts to provide a secure interconnection between the carrier 28 and fabric 16. Where the resin of the carrier 28 is from the same family as the resin of the fabric 16, the carrier 28 and the fabric 16 adhere to one another. The encapsulation process not only produces a strong bond, but also reduces the likelihood of the fabric unraveling along its periphery. Although the seat carrier 28 is preferably attached to the fabric 16 using encapsulation, the seat carrier can be separately manufactured and attached to the fabric using conventional attachment techniques. For example, the carrier can be manufactured from two parts that sandwiched the fabric (not shown).

MANUFACTURE AND ASSEMBLY

Except as described below, the present invention is manufactured using conventional apparatus. The pedestal 20, top plate 22 and back support 24 are manufactured using conventional techniques and apparatus. The top plate 22 is configured in a conventional manner to be interfitted with and supportably receive the seat frame 26. Similarly, the back support 24 is configured in a conventional manner to be interfitted with and supportably receive the back frame 30. The top plate 22 and back support 24 are preferably manufactured from a conventional structural resin. If desired, recliner and other adjustment mechanisms can be incorporated into the pedestal 20 and top plate 22.

The load bearing fabric 16 is premanufactured and is available from a variety of well-known suppliers. For example, the fabric may be manufactured from Dymetrol fabric available from Acme Mills of Detroit, Mich.; Pellicle fabric available from Quantum Inc. of Colfax, N.C.; Collage fabric available from Matrix of Greensboro, N.C. or Flexnet fabric available from Milliken of Spartanburg, S.C. The load bearing fabric 16 is cut, preferably using conventional die cutting techniques and apparatus. The size and shape of the fabric 16 is preselected, such that it assumes the desired shape once the desired tension is applied. For example, if 5% stretch is desired in a first direction and 2% stretch in a second direction, the fabric can be cut approximately 5% smaller in the first direction and 2% smaller in the second direction. If the fabric is not design to terminate within the mold cavity, it may be provided with a peripheral marginal portion 17 that can be held between the ejector die and the cover die to hold the fabric in the desired position within the mold.

Figure 6:
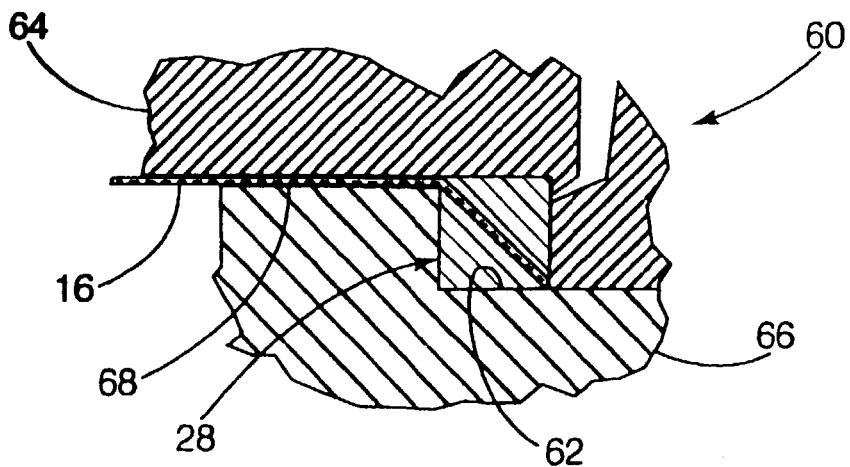
FIG. 6 is a sectional view of the mold showing the fabric in the mold.

Referring now to FIG. 6, the load bearing fabric 16 is placed in the mold cavity 62 of the mold 60 for the seat carrier 28. The fabric 16 is placed in the mold cavity 62 in a relaxed state with no creases or folds. If desired, the fabric 16 may even include slack, thereby permitting the construction of an end product in which the carrier 28 is stretched more than the fabric 16. As noted above, the fabric 16 may extend through the mold cavity 62 and be trapped along a peripheral marginal portion between the dies 64 and 66 (See FIG. 6) or it may terminate within the cavity (not shown). In the preferred embodiment, the dies 64 and 66 define a slight relief 68 inwardly from the mold cavity to prevent potential crushing damage to the fabric 16 inwardly from the carrier 28 when the dies are closed. The relief 68 is, however, small enough to prevent the flow of molten material out of the mold cavity 62 and into the relief 68. The seat carrier 28 is then injection molded about the periphery of the fabric 16 using generally conventional molding techniques and apparatus. Suffice it to say that molten material is introduced into the mold cavity 62, where it flows through and, after curing, becomes intimately interconnected with the fabric 16. The seat carrier 28 is preferably manufactured from Hytrel 4556 or 5556 available from Dupont, Arnitel EM 440 available from Dutch State Mine ("DSM") of Evansville, Ind. or other thermoplastic elastomers. After the carrier 28 is sufficiently cured, the carrier/fabric assembly is removed from the mold, providing a relaxed fabric 16 contained within a relaxed carrier 28. Any peripheral marginal portion 17 can be trimmed from the fabric 16 as desired. In applications where welded fabric is used, the carrier may be manufacture from a resin selected from the polyolefin family of resins, and more particularly from a polypropylene co-polymer, such as J/68 available from DSM. Materials from other families of resins may also be acceptable provided that they have adequate elongation properties (e.g. permit elongation of approximately 3%–8% required to tighten the support component of the fabric), such as polyurethane resins and metallozine polyethylene materials.

The seat frame 26 is also manufactured using conventional molding apparatus. The seat frame 26 is molded with channel 48 to receive the seat carrier 28. The channel 48 is not, however, necessary and the seat carrier 28 can be attached to a flat surface of the seat frame 26 using conventional fasteners or the like. The seat frame 26 is adapted to mount to the top plate 22. The seat frame 26 is preferably manufactured from nylon, polypropylene or PET or other structural resins, and may be reinforced with glass fibers or other similar reinforcement materials. After it is sufficiently cured, the seat frame 26 is removed from the mold. A plurality of screw holes 41 are drilled into the frame 26 to receive screw 43 for intersecuring the seat carrier 28 and seat frame 26. The number and location of screw holes 41 will vary from application. As noted above, the screws 43 may be replaced by other attachment mechanisms. For example, the seat carrier 28 and seat frame 26 may be formed with interlocking tabs and slots (not shown) that permit the carrier 28 to snap-lock into place in the frame 26. A second set of screw holes (not shown) are drilled into the seat frame 26 to receive screws for attaching the seat frame 26 to the top plate 22.

The seat carrier 28 is next mounted to the seat frame 26. In general, the seat carrier 28 is attached to the seat frame 26 by expanding the carrier 28 and fabric 16 to correspond with the size and shape of channel 48 in the seat frame 26. The expanded carrier 28 and fabric 16 is then fitted into the channel 48, where it is secured by screws 72. The seat carrier 28 can be expanded manually or using expanding machinery (not shown), depending in part on the force required to reach the desired amount of stretch. The seat frame 26 is then secured to the top plate 22 to complete assembly of the seat 12.

As noted above, the back 14 is manufactured and constructed in a manner similar to the seat 12. In short, the seat back fabric 18 is cut to the desired shape, the back carrier 32 is molded in situ onto the fabric 18, the back frame 30 is molded, and the back carrier 32 and fabric 18 are expanded and mounted to the back frame 30. The assembled back 14 is then mounted to the back support 24 in a generally conventional manner.

ALTERNATIVE EMBODIMENTS

Figure 7A:
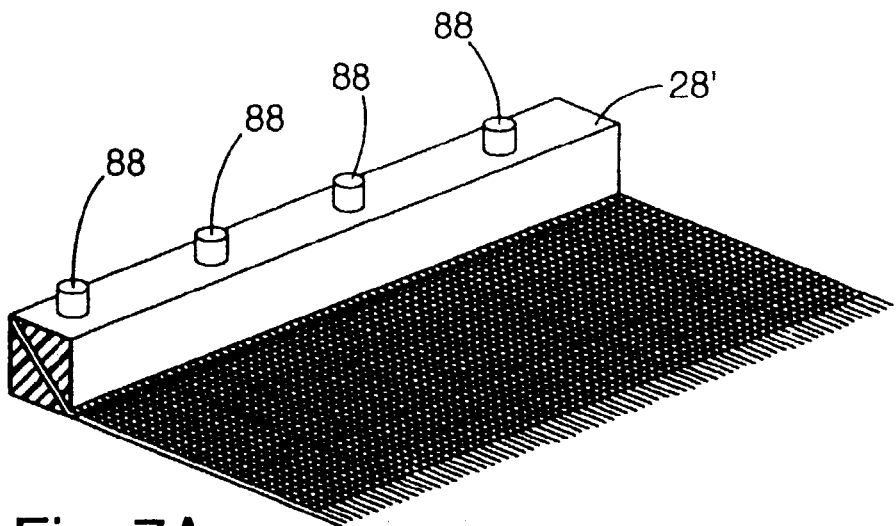
FIG. 7A is a perspective view of a portion of a first alternative carrier having indices.
Figure 7B:
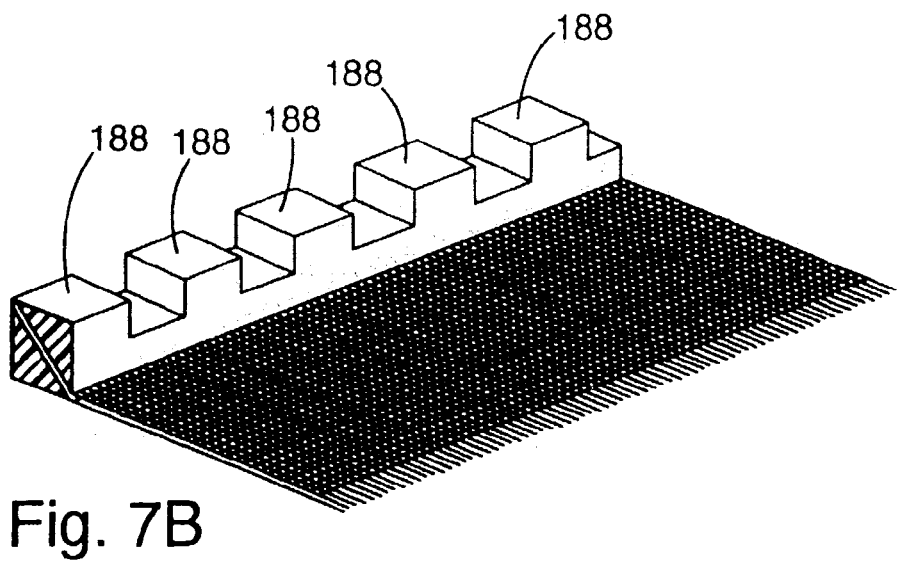
FIG. 7B is a perspective view of a portion of a second alternative carrier having indices.
Figure 7C:
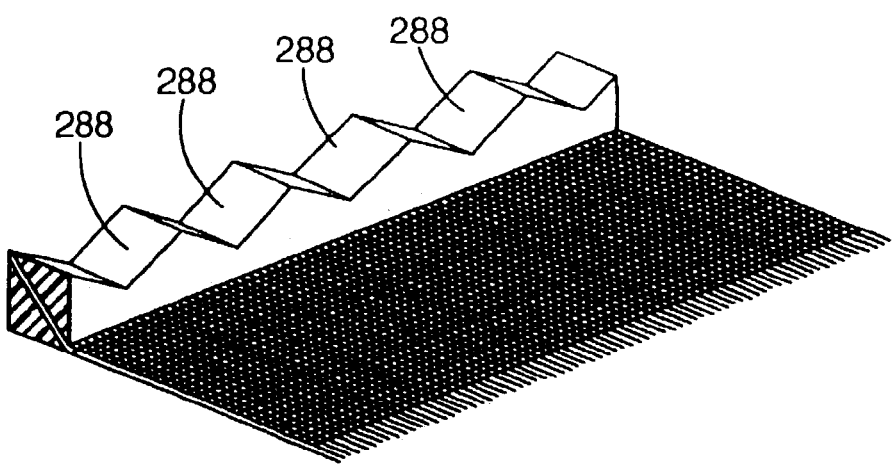
FIG. 7C is a perspective view of a portion of a third alternative carrier having indices.

An alternative embodiment of the present invention is shown in FIGS. 7A–C. In this embodiment, the seat carrier 28' and seat frame (not shown) are generally identical to the seat carrier 28 and seat frame 26 of the above described embodiment, except that the seat frame 26' and seat carrier (not shown) are manufactured with indices 88 that facilitate uniform stretching of the carrier 28' and fabric 18'. In this embodiment, the seat carrier 28' includes a plurality of indices 88 arranged uniformly thereabout. Although not illustrated in the Figs., the seat frame of this embodiment defines an equal number of corresponding apertures (not shown) arranged uniformly thereabout. The apertures are configured to closely receive the indices 88 such that the indices 88 can be inserted into the apertures (not shown) during attachment of the carrier 28' to the frame (not shown) to ensure uniform stretch. The size, shape, configuration and arrangement of indices will vary from application to application. For example, the circular indices 88 can be replace by square 188 (See FIG. 7B), rectangular (not shown) or tapered 288 (See FIG. 7C) indices. In some applications, the carrier may include only a single index, which functions to locate the carrier within the frame, for example, to properly align a logo on the carrier. If desired, the indices 88 can be shaped to interlock with the carrier frame 26, for example, with an enlarge head (not shown) to securely snap into the corresponding aperture 90.

The seat carrier 28' is installed in the seat frame by inserting a first index 88 into the corresponding aperture, and then serially inserting each additional index 88 into each corresponding aperture. The process can be performed manually or using machinery capable of "stretch rolling" the seat carrier 28' into place. If desired, the indices 88 can be used to intentional vary the amount of stretch throughout various regions of the carrier 28'. For example, the indices 88 can be arranged to provide increased stretch throughout specific regions of the carrier 28' by increasing the spacing of the apertures in the frame while maintaining the uniform spacing of the indices 88 or by decreasing the spacing of indices 88 while maintaining the uniform spacing of the apertures.

Figure 8:
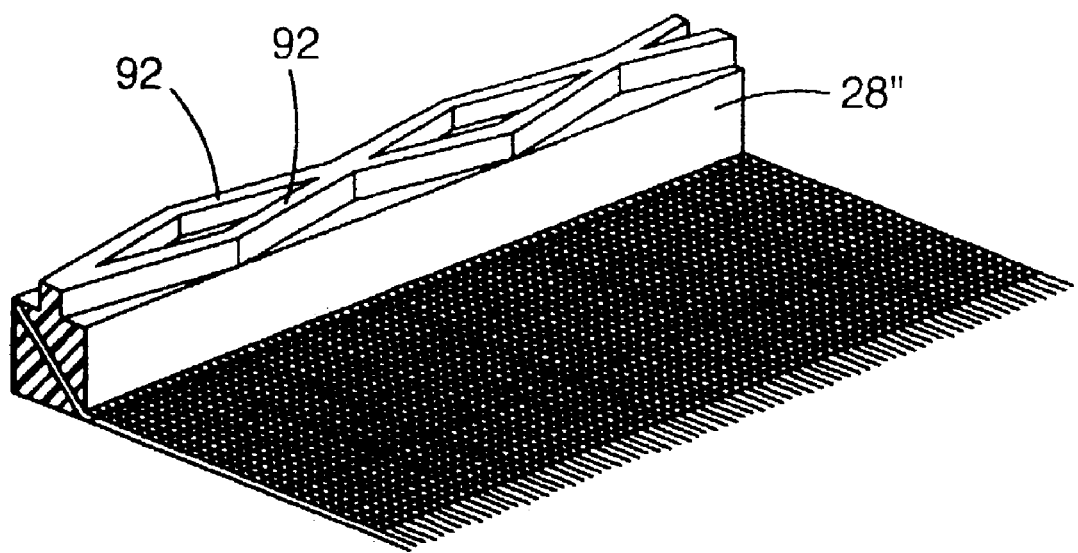
FIG. 8 is a perspective view of a portion of a first alternative carrier having expansion joints.
Figure 9:
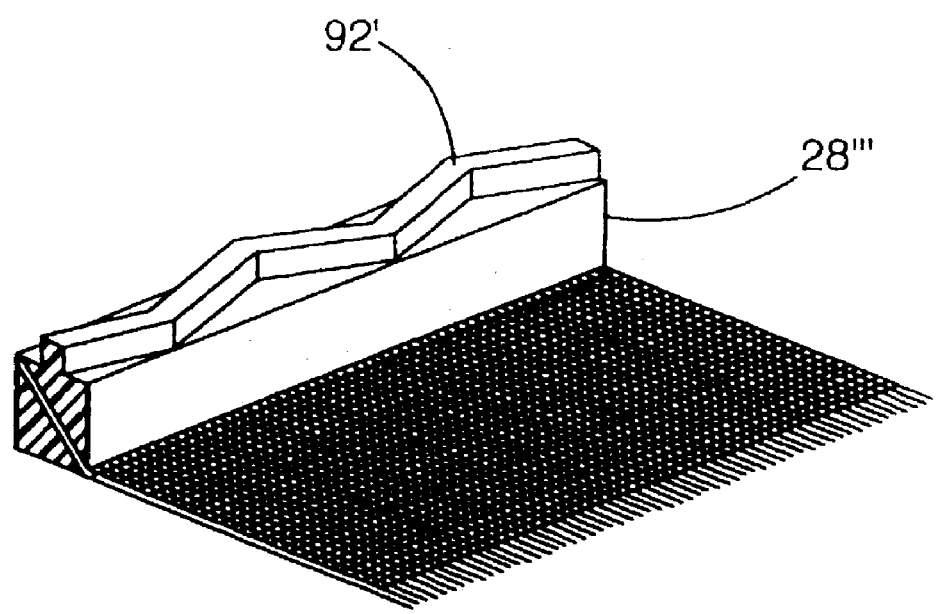
FIG. 9 is a perspective view of a portion of a second alternative carrier having expansion joints.

A second alternative embodiment of the present invention is shown in FIG. 8. In this embodiment, the carrier 28" is formed with integral expansion joints to facilitate uniform stretch in the carrier 28". As illustrated in FIG. 8, the expansion joints are defined by an X-shaped pattern of ribs 92 forms along the bottom of the carrier 28". During initial stretching, the angled ribs 92 pivot or deflect into toward the direction of stretch. This pivot or deflection provides relatively little resistance to stretching of the carrier because it requires relatively little elongation of the ribs 92. Once the ribs 92 have deflected to the point where further deflection is inhibited (e.g. the ribs are in general alignment with the direction of stretching), any further stretching requires substantially more elongation of the ribs 92, thereby increasing the resistance to further stretching. Because of this increase in resistance after initial stretching, the carrier 28' will tend to undergo initial stretching about its entirety before undergo further stretching in any specific region. Alternatively, the X-shaped ribs 92 can be replaced by a single, zig-zag rib 92' that extend along the entirety of the carrier 28'" (See FIG. 9).

Figures 10, 11:
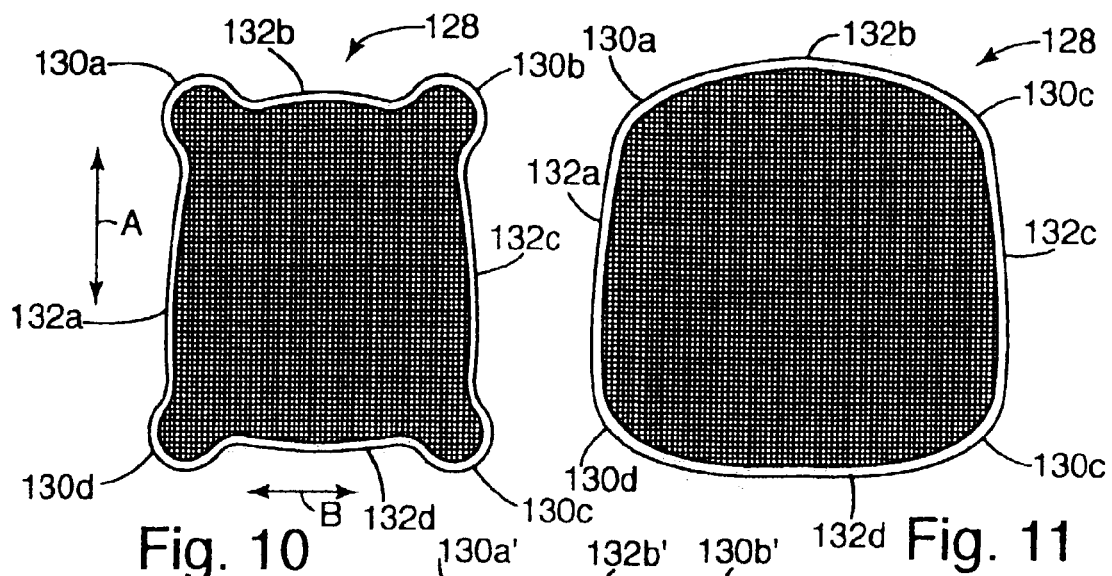
FIG. 10 is a top plan view of a first alternative carrier having corner joints in the relaxed state.
FIG. 11 is a top plan view of a first alternative carrier having corner joints in the expanded state.
Figure 12:
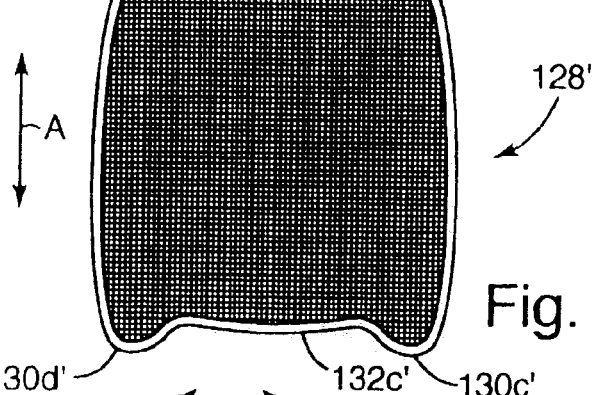
FIG. 12 is a top plan view of a second alternative carrier having corner joints, showing the carrier in the relaxed state in solid lines and in the expanded state in phantom lines.

Yet another alternative embodiment is shown in FIGS. 10–12. In this embodiment, the carrier 128 includes corner joints 130a–d that deform during expansion of the carrier 128 to permit expansion without significant stretching of the carrier 128. Referring to FIG. 10, the carrier 128 includes generally straight sections 132a–d interconnected by corner joints 130a–d. The corner joints 130a–d are generally loop-shaped portions dimensioned and shaped to deform or deflect to the desired shape when the carrier 128 is expanded (See FIG. 11). The precise size and shape of the corner joints 128 will be selected to provide the desired expansion. In fact, the corner joints 128 can be shaped to provide different amounts of stretch in different directions by varying the size and shape of the corner joints. For example, larger loops can be used to provide greater stretch and smaller loops can be used to provide lesser stretch. In the embodiment of FIGS.

10 and 11 the corner joints 128 are adapted to provide significant expansion in the directions of lines A and B. To expand the carrier 128, opposed straight section 132a,132c and 132b, 132d are gripped and drawn apart. This causes the corner joints 130a–d to deform, essentially deflecting or bending open to bring the straight sections 132a–d into general alignment with the outermost extreme of the corner joints 130a–d. In contrast, the alternative embodiment shown in FIG. 12 includes corner joints 130a–d' designed to provide controlled stretch in primarily only a single direction. With this embodiment, the carrier 128' provides primary expansion in the direction of line A and only minimal expansion in the direction of line B. To expand the carrier 128', the straight sections 132b and 132d are drawn apart from one another causing deflecting of the corner joints 130a–c' to bring the straight sections 132b and 132d into general alignment with the outermost extreme of the corner joints 130a–d.

Figures 13, 14:
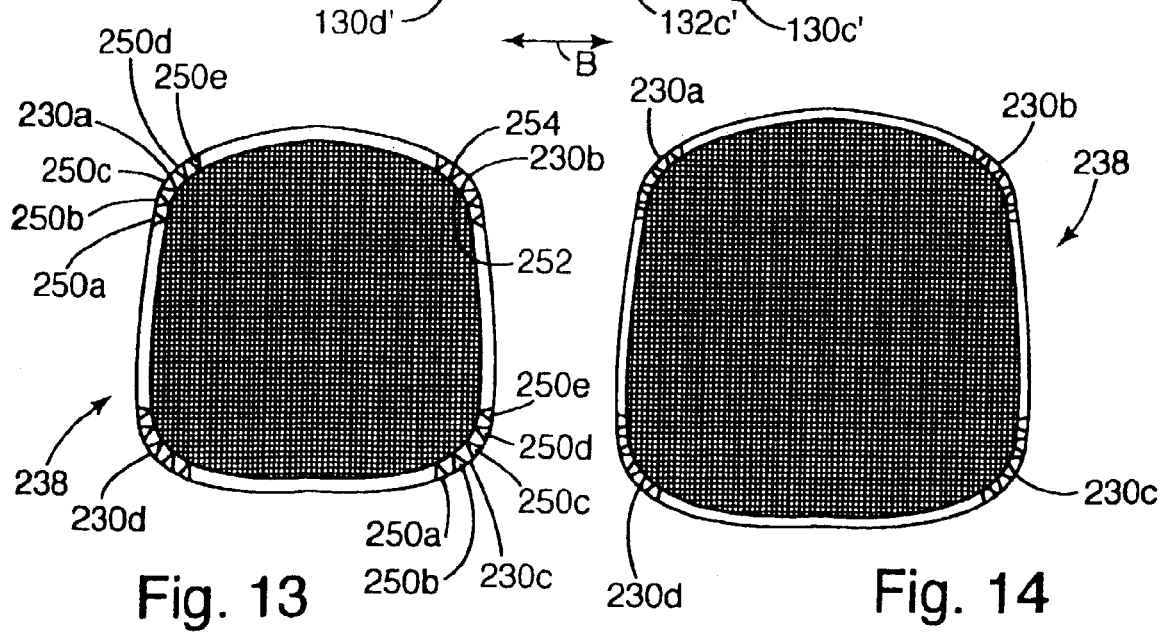
FIG. 13 is a bottom plan view of a third alternative carrier having corner joints in the relaxed state.
FIG. 14 is a bottom plan view of a third alternative carrier having corner joints in the expanded state.
Figure 15:
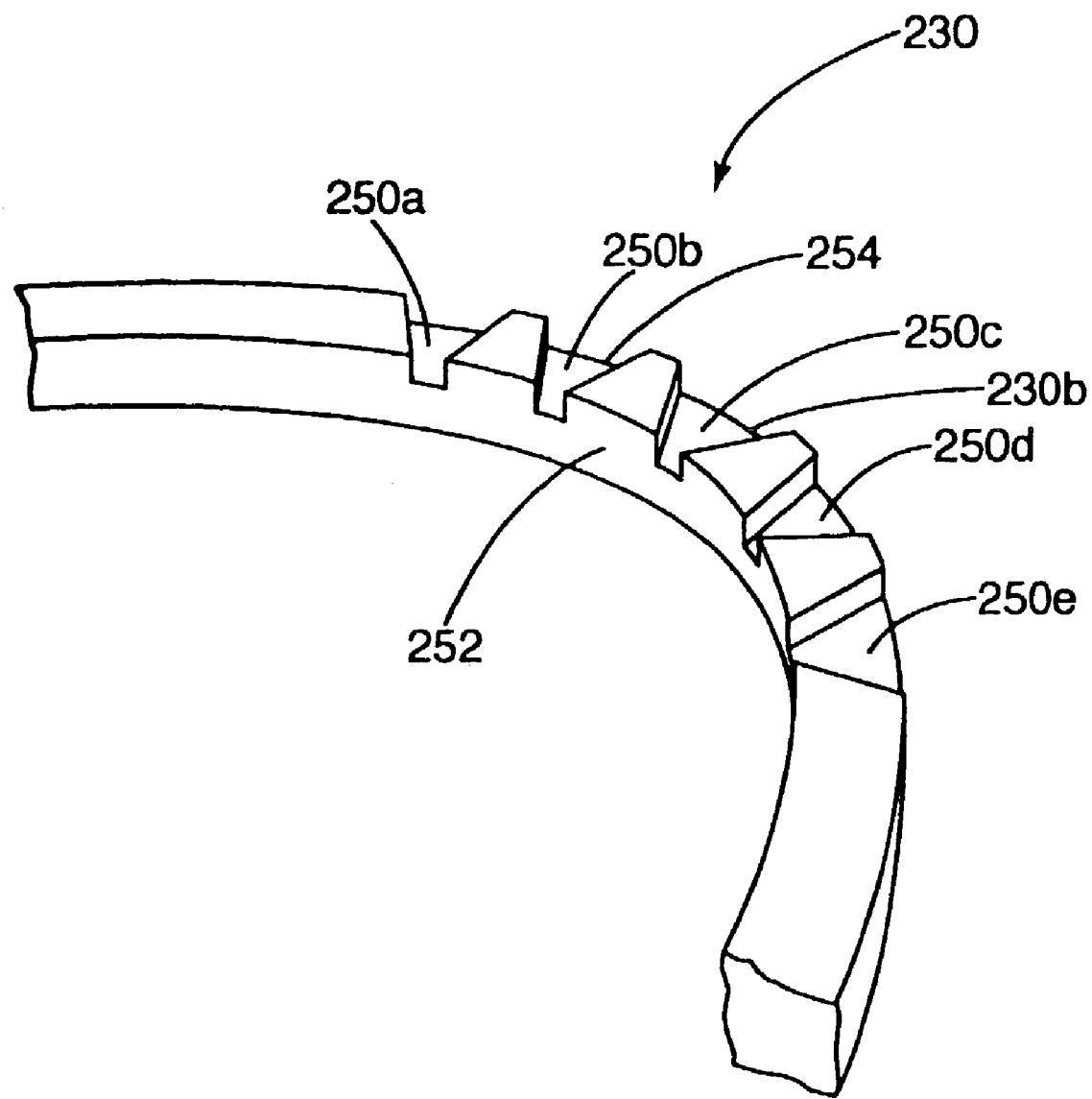
FIG. 15 is a bottom perspective view of a portion of the third alternative carrier having corner joints in the expanded state.

A seat 238 carrier with alternative corner joints 230a–d is shown in FIGS. 13 and 14. In this embodiment, the corner portions of the carrier 238 are designed to stretch rather than deflect or bend during expansion. In general, the corner joints 230a–d are provided with a reduced cross-sectional area to focus stretching in the corners. As shown in FIGS. 13–15, the corner joints 230a–d preferably include cut out sections 250a–e, which define areas of reduced resistance to stretching, and consequently focus stretching of the carrier 238 in the corners. The cut-out sections 250a–e are preferably tapered to provide uniform stretching transversely across the carrier 238. Because of its curved configuration, the corners will undergo progressively increased stretching as you move from its innermost edge 252 to its outermost edge 254. By tapering the cut out sections 250a–e so that the necessary amount of stretch is proportional to the width of the cut out section 250a–e, expansion can occur without causing bowing or twisting in the corner joints 230a–d. Alternatively, the cut outs 250a–e can be eliminated and the cross sectional area of the corner joints can simply be reduced uniformly throughout (not shown).

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

What is claimed is:

1. An assembly comprising;
   a substantially rigid frame;
   a carrier mounted to said frame, said carrier having a relaxed state and an expanded state, said carrier being mounted to said frame in said expanded state;
   a load bearing fabric interconnected with said carrier, said fabric having a relaxed state and a stretched state and being interconnected with said carrier such that movement of said carrier from said relaxed state into said expanded state moves said fabric from said relaxed state into said stretched state, said fabric being mounted to said carrier prior to attachment of said carrier to said frame while said carrier is in said relaxed state and said fabric is in said relaxed state, whereby said fabric is in said stretched state when said carrier is mounted to said frame, wherein said carrier is expanded primarily by stretching said carrier in a longitudinal direction, and wherein said carrier is mounted to said fabric by molding said carrier in place on said fabric such that said carrier and said fabric are intimately interconnected.

2. The assembly of claim 1 wherein a cross-sectional area of said carrier is varied in different regions along said carrier to control the amount of expansion of said carrier in said different regions.

3. The assembly of claim 2 wherein said carrier includes corner regions, a cross-sectional area of said carrier in said corner regions being reduced to substantially focus said stretching of said carrier in said corner regions.

4. An assembly comprising:
   a substantially rigid frame;
   a carrier mounted to said frame, said carrier having a relaxed state and an expanded state, said carrier being mounted to said frame in said expanded state;
   a load bearing fabric interconnected with said carrier independent of said frame, said fabric having a relaxed state and a stretched state and being interconnected with said carrier such that movement of said carrier from said relaxed state into said expanded state moves said fabric from said relaxed state into said stretched state, said fabric being mounted to said carrier prior to attachment of said carrier to said frame while said carrier is in said relaxed state and said fabric is in said relaxed state, whereby said fabric is in said stretched state when said carrier is mounted to said frame, wherein said carrier is expanded primarily by stretching said carrier in a longitudinal direction, wherein said carrier includes expansion joints.

5. The assembly of claim 4 wherein said expansion joints include at least one rib extending in a zig-zag pattern longitudinally along said carrier.

6. The assembly of claim 4 where said expansion joints include a pair of ribs extending in an intersecting, zig-zag pattern longitudinally along said carrier.

7. An assembly comprising;
   a substantially rigid frame;
   a carrier mounted to said frame, said carrier having a relaxed state and an expanded state, said carrier being mounted to said frame in said expanded state;
   a load bearing fabric interconnected with said carrier, independent of said frame said fabric having a relaxed state and a stretched state and being interconnected with said carrier such that movement of said carrier from said relaxed state into said expanded state moves said fabric from said relaxed state into said stretched state, said fabric being mounted to said carrier prior to attachment of said carrier to said frame while said carrier is in said relaxed state and said fabric is in said relaxed state, whereby said fabric is in said stretched state when said carrier is mounted to said frame, wherein said carrier is expanded primarily by deflecting select portions of said carrier wherein said carrier includes one or more corner loops, said one or more corner loops being deflected to provide expansion of said carrier.

* * * * *